United States Patent
Deligiannis

(10) Patent No.: US 10,353,349 B2
(45) Date of Patent: Jul. 16, 2019

(54) LOAD CONTROL BY ADAPTIVE DUTY CYCLING

(71) Applicant: Energate Inc., Ottawa (CA)

(72) Inventor: Jorge Deligiannis, Ottawa (CA)

(73) Assignee: ENERGATE INC., Ottawa (CA)

( * ) Notice: Subject to any disclaimer, the term of this patent is extended or adjusted under 35 U.S.C. 154(b) by 408 days.

(21) Appl. No.: 14/986,058

(22) Filed: Dec. 31, 2015

(65) Prior Publication Data

US 2016/0329706 A1 Nov. 10, 2016

Related U.S. Application Data

(60) Provisional application No. 62/156,672, filed on May 4, 2015.

(51) Int. Cl.
 G05B 13/02 (2006.01)
 G06Q 50/06 (2012.01)
 H02J 3/14 (2006.01)

(52) U.S. Cl.
 CPC ........... G05B 13/026 (2013.01); G06Q 50/06 (2013.01); H02J 3/14 (2013.01); Y02B 70/3225 (2013.01); Y04S 20/222 (2013.01)

(58) Field of Classification Search
 CPC .................................................. G05B 13/026
 See application file for complete search history.

(56) References Cited

U.S. PATENT DOCUMENTS

| | | | | |
|---|---|---|---|---|
| 2012/0245868 A1* | 9/2012 | Imahara | ................... | H02J 3/00 702/61 |
| 2014/0096946 A1* | 4/2014 | Rognli | .................. | F24F 11/006 165/209 |
| 2014/0277761 A1* | 9/2014 | Matsuoka | .............. | F24F 11/006 700/276 |
| 2015/0134122 A1* | 5/2015 | Modi | ................... | F24F 11/0012 700/276 |

\* cited by examiner

*Primary Examiner* — Mohammad Ali
*Assistant Examiner* — Vincent W Chang
(74) *Attorney, Agent, or Firm* — Gowling WLG (Canada) LLP

(57) ABSTRACT

An adaptive load control system and method are provided. A rolling table is utilized to collect duty cycle information of an electrical appliance during defined time periods. The oldest entry in the rolling table is utilized to populate a history table containing historic duty cycle information for weekly time periods. When a load control event is received at the load controller a historic duty cycle profile and predicted duty cycle profile are determined. Using a received reduction factor from the load control event a restricted duty cycle profile is generated using the historic and predicted duty cycle profiles and applied to the electrical appliance during the load control event time period.

22 Claims, 10 Drawing Sheets

LOAD CONTROL BY ADAPTIVE DUTY CYCLING

CROSS-REFERENCE TO RELATED APPLICATIONS

This application claims priority from U.S. Provisional Application No. 62/156,672 filed May 4, 2015 the entirety of which is hereby incorporated by reference for all purposes.

TECHNICAL FIELD

The present disclosure relates to load control events or demand response and in particular to load control via adaptive duty cycling.

BACKGROUND

Utilities typically manage peak energy demand by load control programs which limit equipment use during peak hours. In the residential and small commercial environments this is typically performed by a Load Control Switch (LCS), also known in the industry as a Load Control Receiver, which interrupts the control line from a thermostat to its associated heating ventilation and air conditioning (HVAC) unit or directly interrupts the power line feeding the appliance which could be not only an HVAC unit but other type of loads like water heaters, pool pumps, etc.

LCSs have normally a receiver (for one-way communications from the utility to the LCS) or a transceiver (for two way communications) using a variety of technologies either wired (like Power Line Carrier) to wireless (pager, cellular, ZigBee™, Wi-Fi™ and others). Therefore the utility has the capability to send Load Control commands to the LCS to limit the usage of the equipment connected to the LCS by setting a maximum duty cycle for a limited period of time (i.e. peak reduction hours).

However there are scenarios where some consumers may have oversized equipment for the space to be conditioned, i.e. a high capacity air conditioner which runs only 40 to 60% of the time even during the hottest days of the summer. In this case, when the utility needs to reduce the demand by 50%, a Load Control event that limits the equipment usage to 50% will hardly affect the households with high capacity equipment while penalizing those with smaller units. On the other hand, it will be harder for the utility to predict the amount of overall load reduction since a number of units will be still running as usual while others will be limited to the set 50%. This may force the utility to further reduce the allowed running time to perhaps 40 or 30 percent to achieve its target and with it heavily penalizing the households with smaller units.

A proposed solution to address this issue is to send a Load Control command which sets, instead of a duty cycle limit, a percentage of duty cycle reduction with respect to the predicted equipment usage during the hours of the Load Control event. This solution is known in the industry as Adaptive Cycling (other terms are also being used like Average Load Adjustment Percentage among others).

The success of this solution greatly depends on how accurate the usage prediction is.

A simple method is to just determine equipment usage during the hour(s) prior to the Load Control event and extrapolate this usage to the event hours. This has two disadvantages: It ignores the house thermal behavior as the day unfolds (i.e. the heat exchange rate due to indoor-outdoor temperature differences and solar radiation absorption, among other factors, changes hour by hour) and also does not account for occupants behavior (their schedules and setting preferences may not require space conditioning until later in the day so if equipment usage was minimal or null during the hours prior to the event, the extrapolation of this usage may prevent the equipment from running during the most demanding hours when the occupants usually need air conditioning).

Another method may keep historic data to learn about the average usage of the equipment but it does not take into account the environmental changes from day to day to properly estimate the usage for the particular day a Load Control event is issued by the utility (typically a hotter day than the ones in the history).

A third method may require network assistance by directing the LCS to just store historical data during particularly hot days with no Load Control event issued. This has the disadvantage of having too few days used as a baseline which may coincide with singularities of the household occupants' behavior thus not reflecting a typical historic usage. Another disadvantage is that special daily commands must be issued to indicate whether the day qualifies as a baseline equipment usage. A third disadvantage is that by using as a baseline the hottest days of the summer, it will be impossible to estimate the usage for a milder day which may still require a Load Control event to offset an increase of demand from other consumers (industrial, etc.) or compensate for the temporary loss of generation or distribution capacity.

The method disclosed addresses all the above mentioned limitations to compute a more accurate prediction of equipment usage without using any external environmental sensors (indoor/outdoor temperature sensors) and/or special network commands, as it also learns about the typical household occupants' behavior without access to thermostat set points and schedule.

Accordingly, systems and methods that enable adaptive load control remains highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
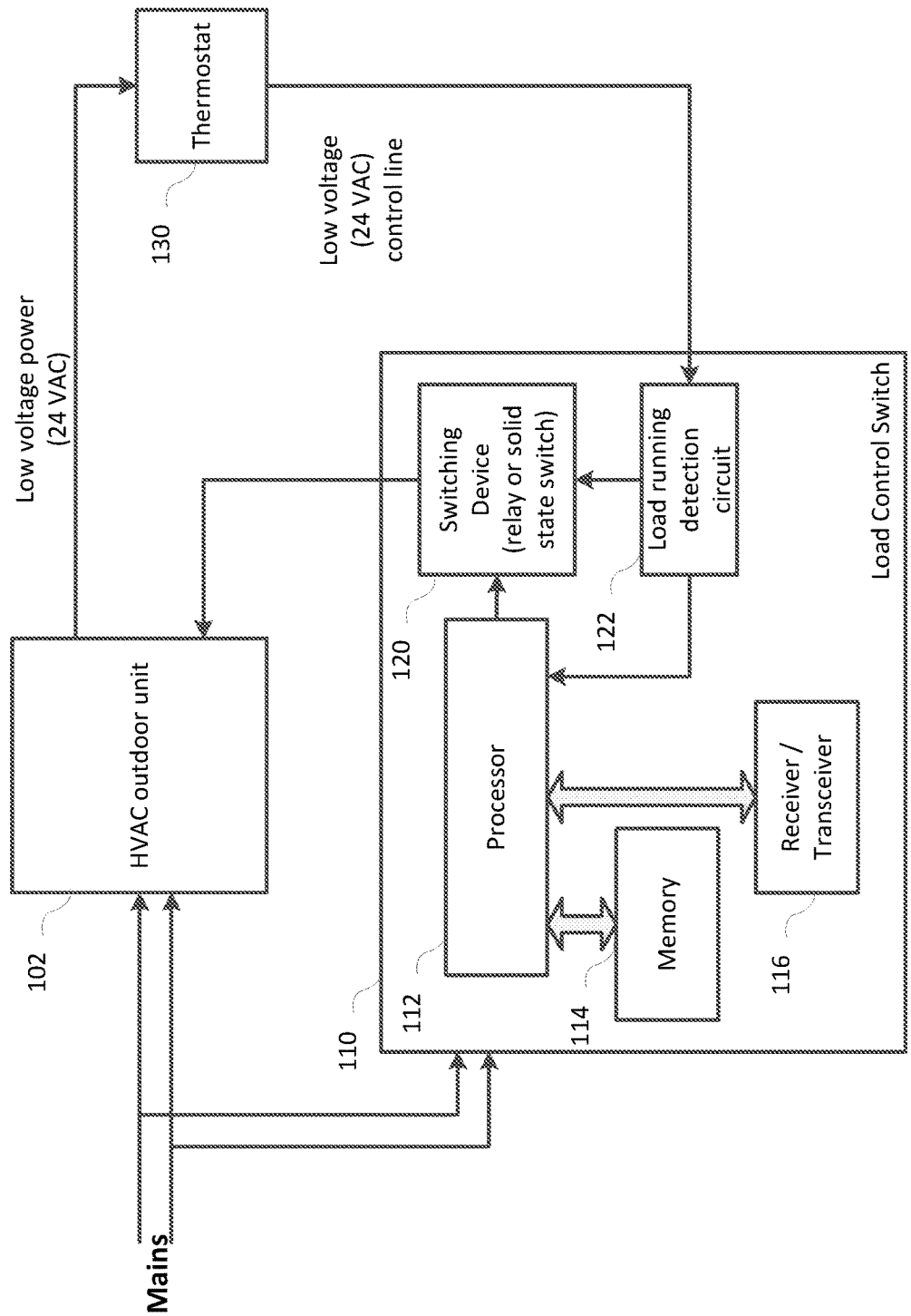
FIG. 1 shows a representation a typical HVAC application of a load control switch.

Embodiments are described below, by way of example only, with reference to FIGS. 1-10. The disclosed (Energate's OptiCycle™) method includes algorithms to more accurately predict equipment usage during the hours of a load control event.

In accordance with an aspect of the present disclosure there is provided a method of performing adaptive load control of an electrical appliance, the method comprising: generating a rolling table comprising current duty cycle information of usage of the electrical appliance; generating a history table containing time period entries providing historic duty cycle information, the time period entries updated based on duty cycle information from the rolling table; receiving a load control event defining an event time period for the event and a reduction factor; determining a historic duty cycle profile from the history table for the load control event time period; determining a predicted duty cycle usage profile from the rolling table and the historic duty cycle profile for the load control event time period; generating restricted duty cycle profile for the load control event time period based upon the predicted duty cycle usage profile and the reduction factor; and applying the restricted duty cycle profile to the electrical appliance during the load control event time period.

In accordance with another aspect of the present disclosure there is provided a load control switch coupled to an electrical appliance, the load control switch comprising: a receiver; a processor coupled to the receiver; and a memory containing instructions for performing adaptive load control of the electrical appliance, the instruction which when executed the processor for performing: generating a rolling table comprising current duty cycle information of usage of the electrical appliance; generating a history table containing time period entries providing historic duty cycle information, the time period entries updated based on duty cycle information from the rolling table; receiving through the receiver a load control event defining an event time period for the event and a reduction factor; determining a historic duty cycle profile from the history table for the load control event time period; determining a predicted duty cycle usage profile from the rolling table and the historic duty cycle profile for the load control event time period; generating restricted duty cycle profile for the load control event time period based upon the predicted duty cycle usage profile and the reduction factor; and applying the restricted duty cycle profile to the electrical appliance during the load control event time period.

In accordance with yet another aspect of the present disclosure there is provided a non-transitory computer readable memory containing instructions for performing adaptive load control of an electrical appliance, which when executed by a processor perform: generating a rolling table comprising current duty cycle information of usage of the electrical appliance; generating a history table containing time period entries providing historic duty cycle information, the time period entries updated based on duty cycle information from the rolling table; receiving a load control event defining an event time period for the event and a reduction factor; determining a historic duty cycle profile from the history table for the load control event time period; determining a predicted duty cycle usage profile from the rolling table and the historic duty cycle profile for the load control event time period; generating restricted duty cycle profile for the load control event time period based upon the predicted duty cycle usage profile and the reduction factor; and applying the restricted duty cycle profile to the electrical appliance during the load control event time period.

The method provided collects historical data and averages them to reduce the influence of singularities as it builds an energy demand profile for the household, hour by hour for each day of the week. To optimize the usage prediction for each hour affected by a Load Control event, it computes a weighted ratio between the usage in the hours prior to the event and the corresponding historic data for those hours, and applies that ratio to the averaged historic usage of the corresponding event hours, thus adjusting the prediction to environmental differences between historic data and the event day conditions. The method is applicable to load or appliances that are oversized or non-oversized or appliances that do not operate at 100% duty cycle during peak demand events.

FIG. 1 shows a representation of a typical HVAC application of a load control switch. The load control switch 110 is coupled to an appliance such as a heating ventilation and air conditioning (HVAC) outdoor unit 102 which is controlled by a thermostat 130. A load control switch 110, comprising a processor 112, memory 114 and transceiver/receiver 116 has a switching device 120 for enabling or disabling the HVAC unit 102 using a relay or solid state switch. A load running detection circuit 122 can receive a control signal from the thermostat 130 to determine when the HVAC unit 102 is requested to be running by the thermostat 130. The processor 112 can receive a load control event, or demand response event, through wireless receiver/transceiver 116. In response to the load control event the load control switch 110 can de-activate or disconnect the HVAC outdoor unit 102.

Figure 2:
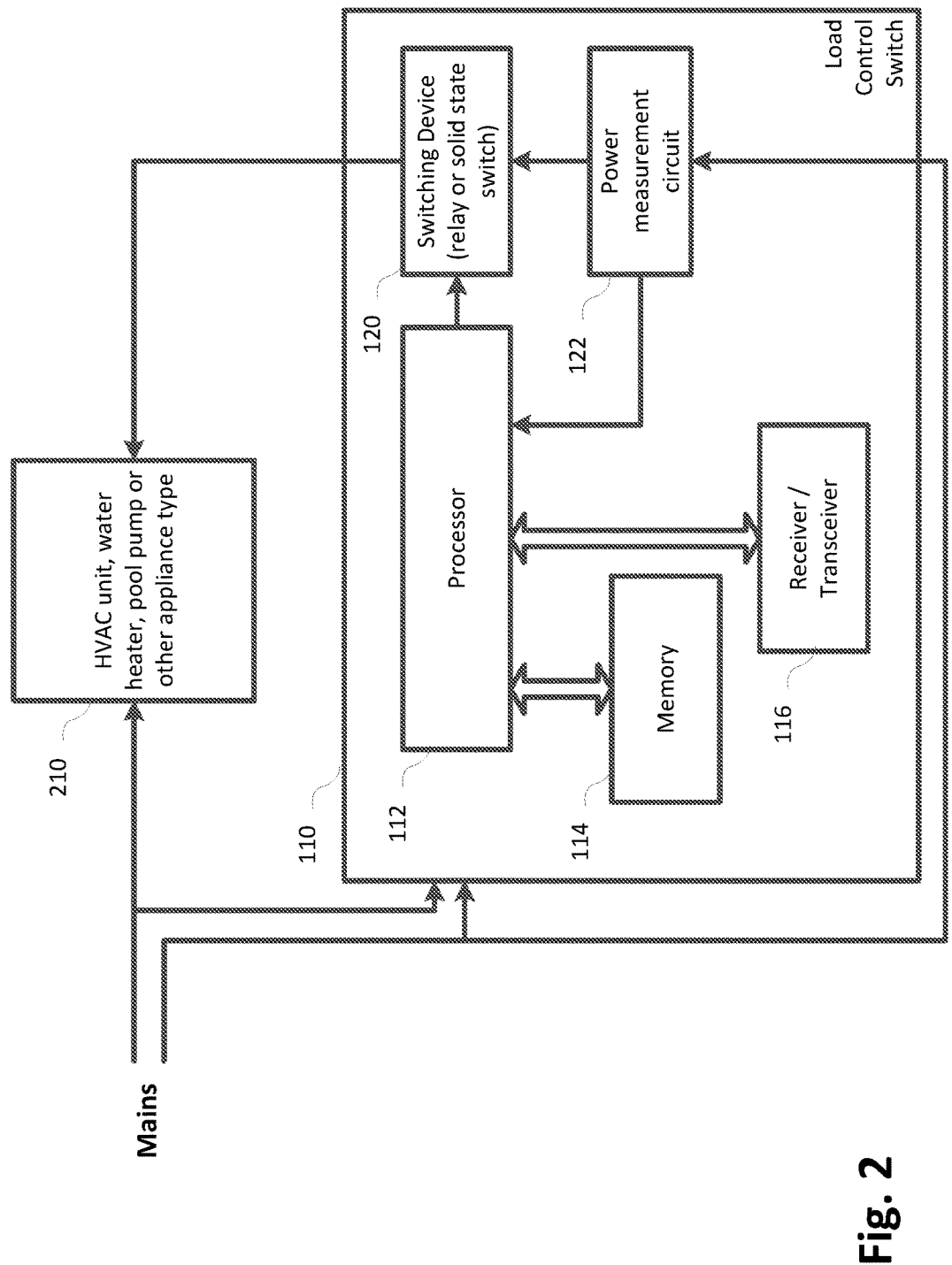
FIG. 2 shows a representation of a generic application of a load control switch for controlling equipment.
Figure 3:
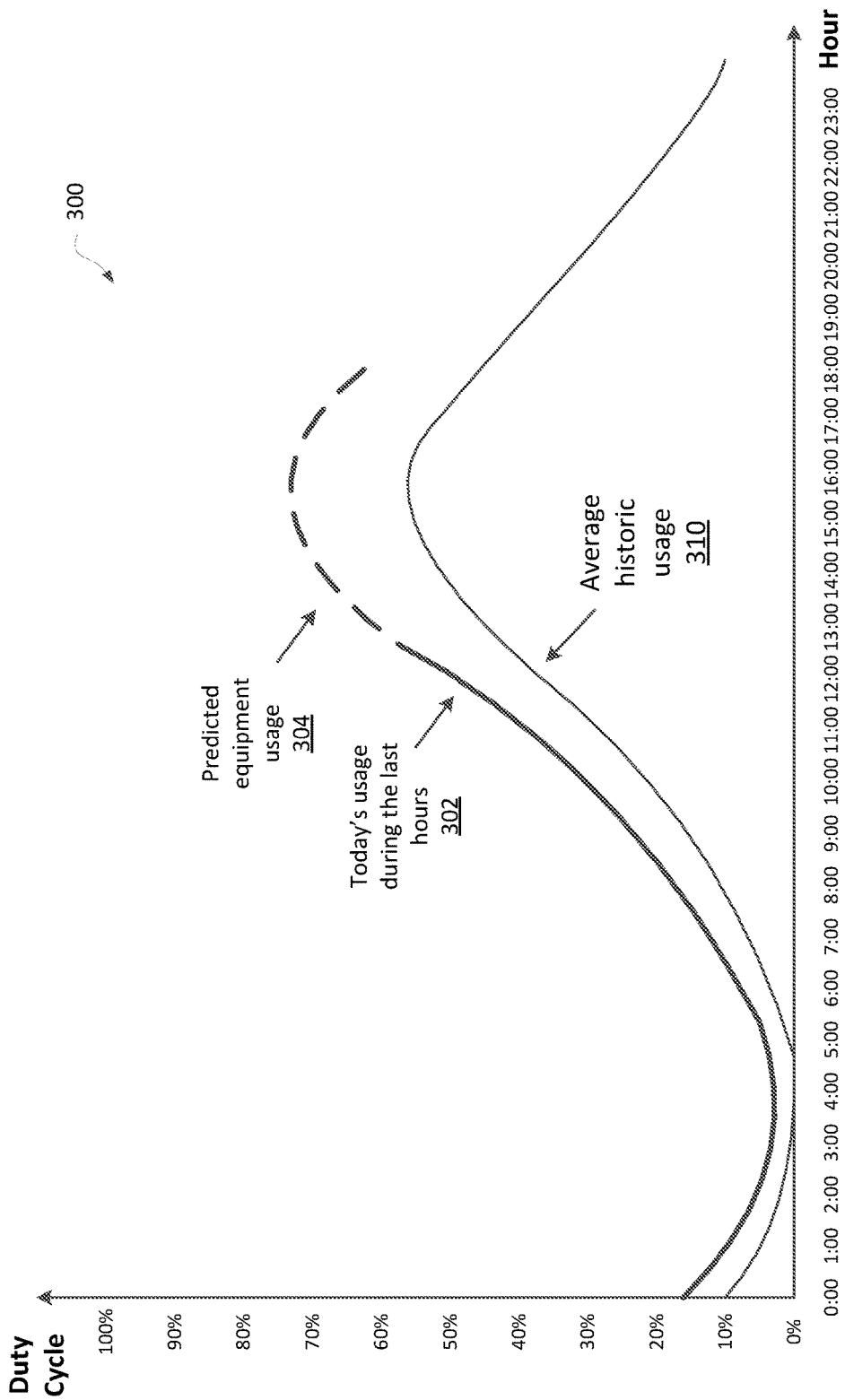
FIG. 3 shows a graphical representation of prediction using average day profile extrapolation.

Referring to FIG. 2 shows a representation of a generic application of a load control switch for controlling equipment. The equipment or appliance 210, such as HVAC unit, water heater, pool pump or other type of appliance, is coupled to and controlled by a load control switch 110. The load control switch 110 can interrupt power to equipment 210 in response to a load control event.

Below follows a more detail description of the prediction method which comprises two algorithms:
Duty Cycle History Recording and Update
Duty Cycle Prediction After the prediction is made for each hour of the event, the utility reduction factor in the Load Control Command is applied to the predicted usage so to limit equipment usage in a proportional manner.

Adaptive duty cycling is based on the consumption history of the load the LCS is controlling (by switching it on and off during an energy event). It is necessary for the LCS to have power measurement or load running detection capabilities to implement adaptive cycling. When the LCS interrupts the power or control line to the load, the load will not be able to run so during a Load Control event no valid equipment duty cycle information (% of usage) can be derived since the usage pattern will be affected by the event itself; so duty cycle information for the hours affected by a Load Control event or a system power interruption (power outage) is considered invalid and so Not Available (N/A).

Duty cycles are calculated in one-hour periods in this example, although other time periods may be utilized. Each period starts and ends at the hour change. The first period of a given day starts at 00:00:00 and ends at 00:59:59 and the last period of the day starts at 23:00:00 and ends at 23:59:59.

This would yield 24 periods per day by 7 days. The calculated duty cycle for each hour period is computed based on the number of seconds the equipment is ON during the hour period, as follows:

$$\text{Calculated Duty Cycle}(h) = \frac{\sum_{S=0}^{3600-1} \text{Equipment On}(S)}{3600} \times 100\%$$

Where S represents a second counter that starts at the start of the hour change and Equipment On is a function of time with a value of one (1->equipment is ON) or zero (0->equipment is OFF), and is sampled every second during the hour period. The equipment is said to be ON if the sampled instantaneous power consumption is higher than a predetermined threshold. For a LCS equipped with load running detection the equipment ON condition is determined by the detection of current on the load circuit and compared to a threshold at the time of sampling.

$$\text{Equipment On}(S) = \begin{cases} 1 - \text{Inst. Power} \mid \text{Current}(S) > \text{Threshold} \\ 0 - \text{Inst. Power} \mid \text{Current}(S) \leq \text{Threshold} \end{cases}$$

For storing the last seven days of duty cycle history, the LCS memory shall maintain a 7 column by 24 row table. Columns may represent each day of the week and rows, the 24 hours in a day. So the 7-day by 24-hour History Table (HT) is updated with the measured equipment duty cycles. Initially all table cells are filled with N/A (an invalid duty cycle value as −1 may be used) indicating that no historic data are available. Alternatively time periods that may not be associated with load control events, such as evenings and weekends, may not be collected depending on the configuration. The time period may also be variable throughout the day based upon usage requirements, for example the time periods may be larger during off-peak period where as the time periods may be small for on-peak periods to provide additional granularity.

Figure 4:
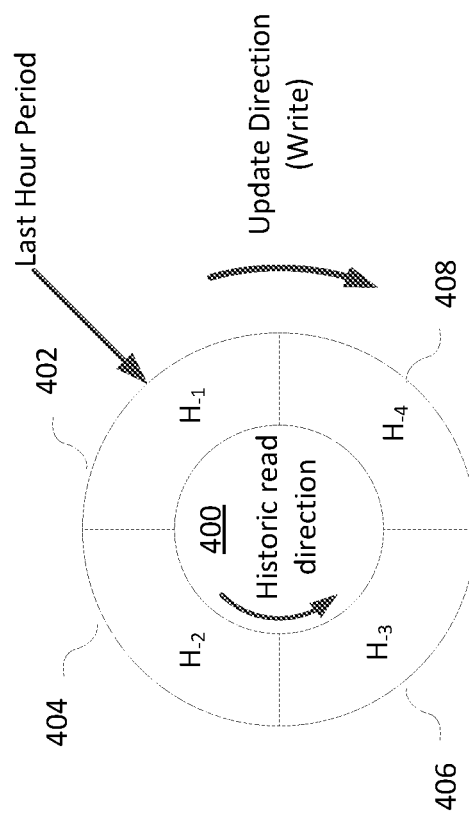
FIG. 4 shows a representation of a 4-hour rolling table.

Referring to FIG. 4, before updating the History Table, the calculated duty cycle for the last hours, or time period, is kept in a separate Rolling Table (RT) 400. The size of the Rolling Table could be of one to several hours but for illustration a 4-hour Rolling Table is described. Data on this Rolling Table will be used for Duty Cycle Prediction. At the change of the hour, the calculated duty cycle for the previous hour Calculated $DC_{h-1}$ is entered in cell $H_{-1}$ 402, while the previous value in $H_{-1}$ is now moved to $H_{-2}$ 404, $H_{-2}$ to $H_{-3}$ 406 and so on. The oldest duty cycle in cell $H_{-4}$ 408 of this illustration ($H_{-n}$ for a Rolling Table of n cells) leaves the Rolling Table and is used to update the History Table. If during the previous hour, a power outage or an event in course affected the normal operation of the load, the duty cycle calculation is invalid so calculated $DC_{h-1}$ is set to −1 (invalid duty cycle value) and entered in $H_{-1}$.

As with the History Table, all cells of the Rolling Table are initialized to −1 at the start of the LCS operation (power-up) indicating that no historic duty cycle information is available.

Note: In a practical implementation, a pointer indicates which is cell $H_{-1}$ and the pointer moves clockwise as we enter new data instead of moving all data from cell to cell counter-clockwise.

Figure 5:
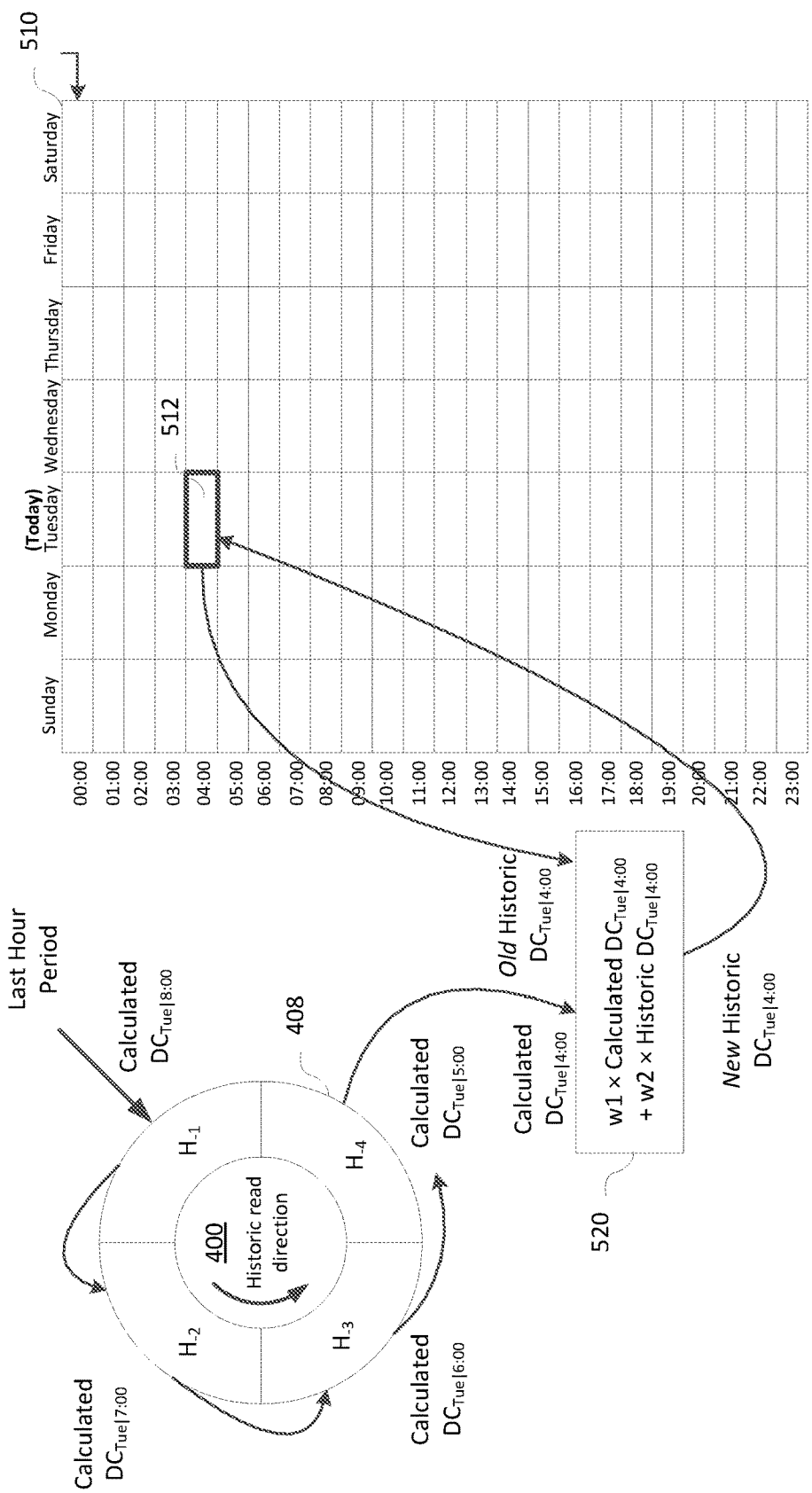
FIG. 5 shows a representation of History Table update using a 4-hour rolling table.

Referring to FIG. 5, to determine which entry of the History Table 510 is updated at the end of each period (hour change), the time (day of the week and hour) of the duty cycle exiting the Rolling Table 400 is used, so that the day of the week determines the column and the hour, and determines the row. As an example, if the current time is Tuesday 9:00:00, the duty cycle for the period from 8:00:00 to 8:59:59, Calculated $DC_{h-1}$, is calculated and entered in cell $H_{-1}$. The previous value in $H_{-1}$ becomes now Calculated $DC_{h-2}$ and goes to $H_{-2}$ and so on. The previous value in $H_{-4}$ 408 exiting the Rolling Table becomes Calculated $DC_{h-5}$ and is the calculated duty cycle for the period starting on this Tuesday at 4:00:00. This is the cell position 512 in the History Table which is updated using a weighted average between the old stored value and the calculated duty cycle Calculated $DC_{h-5}$ 520, thus producing a historic average which reduces the impact of a singular period with atypical equipment usage.

Figure 6:
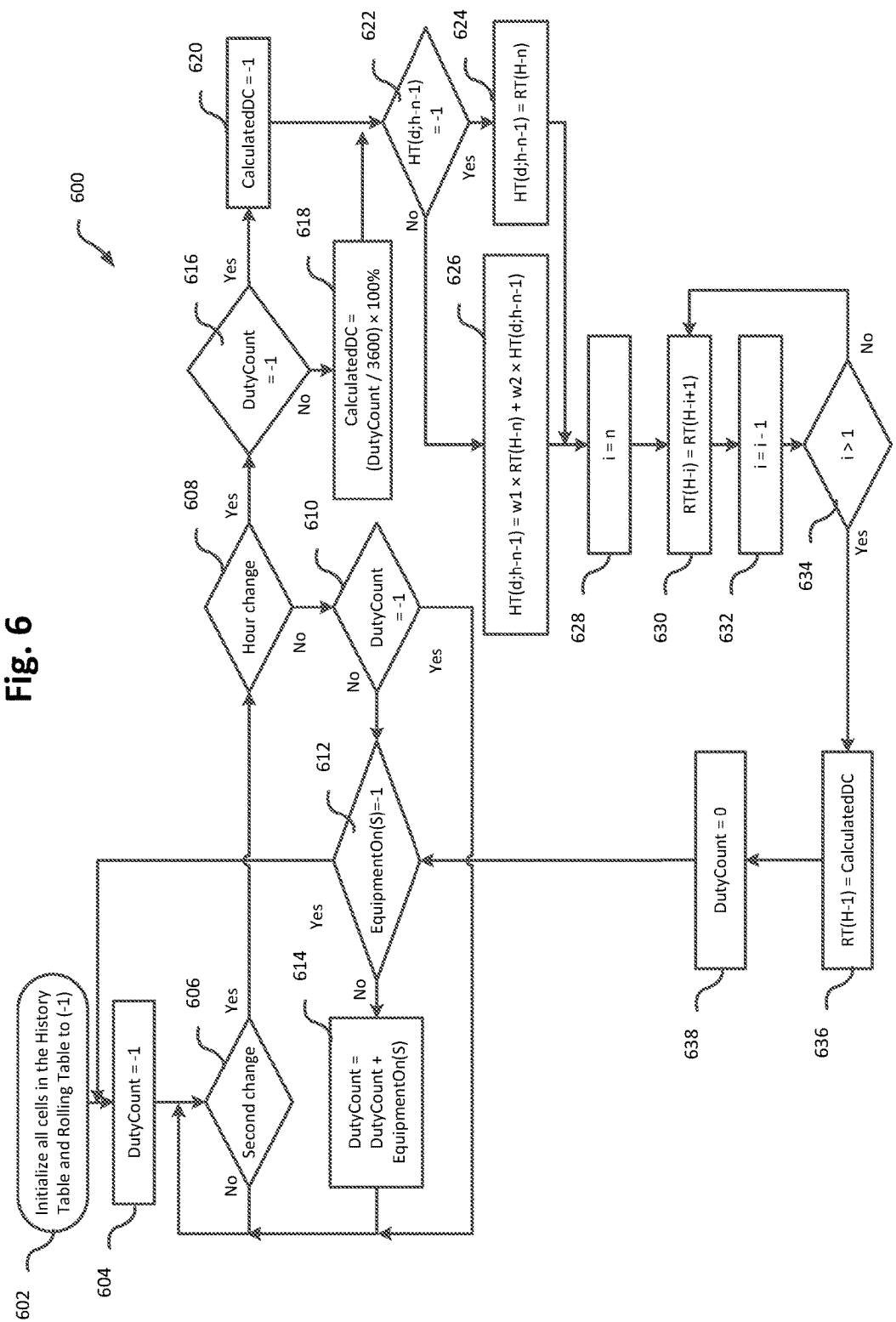
FIG. 6 shows a method for providing History Recording and Update for rolling table and history table.

Referring to FIG. 6, a method (600) for providing History Recording and Update for rolling table and history table is shown. In the figure, RT(H−i)=CalculatedDC(h−i) and HT(d;h-n-1)=HistoricDC(d;h-n-1). All n cells in the history table and rolling table are initialized to −1 (i.e. invalid) (602). The DutyCount is set to −1 (604). The DutyCount is calculated for the time period in which the equipment is being utilized. If there is a second time change (YES at 606) it is determined if there is an hour change. If the hour has not changed (NO at 608) and duty cycle is equal to −1 (YES at 610), that is the current duty cycle is not available (i.e. invalid) the time is monitored until next second change (606). If the DutyCount does not equal −1 (NO at 610) which means the device usage is valid, and if the EquipmentOn(S) is equal to −1 and is therefore not on (YES at 612) then the equipment status information for the last second (S) is invalid or missing due to a Load Control event in progress or loss of power, in which case duty count is set to −1. Otherwise if EquipmentON(S) is 1 and therefore the equipment is ON, or 0 when OFF (NO at 612) the DutyCount is set equal to DutyCount+EquipmentOn(S) (614). If there is an hour change (YES at 608) and the DutyCount does not equal −1 (NO at 616) then CalculatedDC=(DutyCount/3600)×100% (618). If the DutyCount does equal −1 (YES at 616) the CalculatedDC is invalid (620), i.e. set equal to −1. If the history table entry HT(d;h-n-1) is equal to −1 (YES at 622) then the history table entry is updated to the rolling table entry HT(d;h-n-1)=RT(H−n) (624). If HT(d; h-n-1) is not invalid (NO at 622), i.e. does not equal −1, with an n-cell Rolling Table, the entry to be updated in the History Table is the one corresponding to the current (day-|hour)−(n+1) hours where $$\text{HistoricDC}_{d|h-n-1} \rightarrow w1 \times \text{CalculatedDC}_{h-n-1} + w2 \times \text{HistoricDC}_{h-n-1} \quad (626)$$

where w1 and w2 are the historic weighting factors which must satisfy the following conditions:

$$0 \leq w1 \leq 1; \ 0 \leq w2 \leq 1; \ w1+w2=1$$

A smaller w1 compared to w2 reduces the adjustment the newer duty cycle makes to the historic value of same day and time, updated a week ago. A typical implementation may use w1=w2=0.5 so the new calculated duty cycle has the same weight as the historic duty cycle when the historic value is updated.

Note: If for example (d|h)=(Tuesday|3:00) and n=6, then the updated cell in the History Table will be (d|h-n-1)= (Tuesday|3:00-6-1) which is (Monday|20:00).

A counter variable i is then set equal to n (628) to shift the cells in the rolling table. The current period is set equal to the previous period where RT(H−i)=RT(H−i+1) (630) and i is decremented (632). If i is greater than 1 (YES at 634) then RT(H−i)=RT(H−i+1) (630) and i is decremented until all the cells in the table are shifted. If i is equal to 1 (NO at 634) then the previous hour is set to the calculated duty cycle RT(H−1)=CalculatedDC (636) and the duty count is then set equal to 0 (638).

Once a profile of typical equipment usage is recorded on the History Table, the prediction of equipment usage for the current day will be based on a ratio between averaged historic data (recorded on the History Table) and equipment duty cycle during the hours prior to the event (recorded on the Rolling Table). The number of hours prior to the event taken into account depends on the chosen size of the Rolling Table. A typical implementation may use a 4-hour Rolling Table but any number of cells from 1 to n can be chosen. The calculated ratio is then applied to historic data to predict equipment usage (duty cycle) during the hours of the event, should it have not been enforced. Ultimately, during the event, those hourly predicted duty cycles will be affected by the percentage of reduction commanded by the utility's Load Control event.

Figure 7:
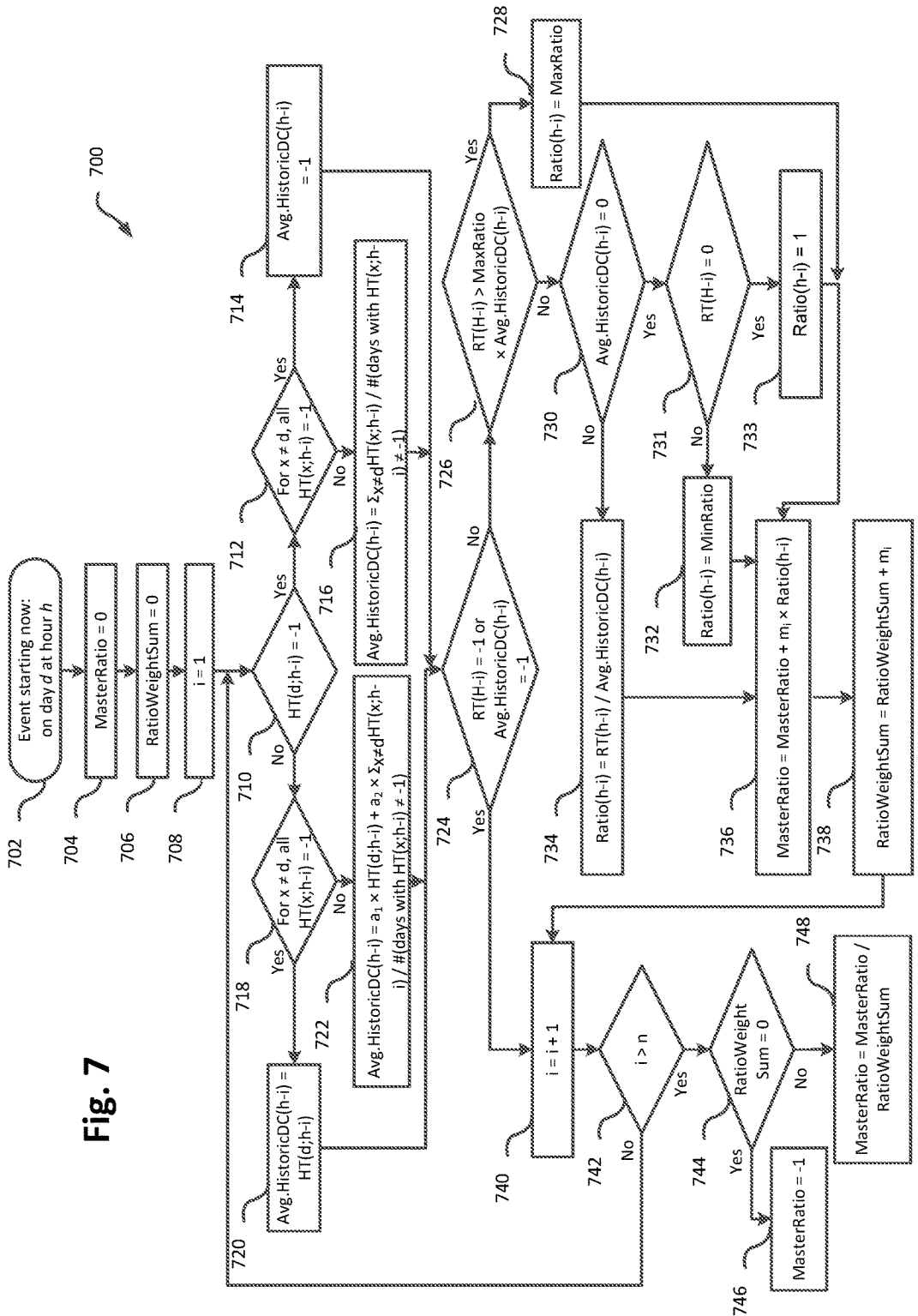
FIG. 7 shows a method for providing Average Historic Duty Cycle and Master Ratio calculations.

Referring to FIG. 7, an example of a method for providing Average Historic Duty Cycle and MasterRatio calculations are shown. The event starts on day d with hour h (702). The master ratio (704) and a ratio weight sum (706) are initialized and the position counter i is set equal to 1 (708). If the historic entry for the particular date and previous h is invalid HT(d;h−i)=−1 (YES at 710), If there are valid entries for any of the other days (NO at 712) then:

$$\text{Avg. HistoricDC}_{h-i} = \frac{\sum_{x \neq d}^{(\text{days with valid HistoricDC}_{x|h-i})} \text{HistoricDC}_{x|h-i}}{\text{\# of other days with valid HistoricDC}_{x|h-i}} \quad (716)$$

If the entry HT(d;h−i) is not invalid (NO at 710) and the remaining entries are also not invalid (NO at 718) for each hour prior to the event (from h−1 to h−n) a weighted average of the Historic Duty Cycle (same day of week and hour, updated 7 days ago) with the average of the other days of the week, at the same hour, is calculated as follows:

For $1 \leq i \leq n$, (722)

$$\text{Avg. HistoricDC}_{h-i} = a1 \times \text{HistoricDC}_{d|h-i} + a2 \times \frac{\sum_{x \neq d}^{(\text{days with valid HistoricDC}_{x|h-i})} \text{HistoricDC}_{x|h-i}}{\text{\# of other days with valid HistoricDC}_{x|h-i}}$$

where a1 and a2 are the historic average weighting factors which must satisfy the following conditions:

$0 \leq a1 \leq 1; \ 0 \leq a2 \leq 1; \ a1+a2=1$

A possible implementation may use a1=a2=0.5 so the current day's historic duty cycle has as much weight as all the other days' historic duty cycles averaged together. Behavioral patterns for a particular day of the week may be distinctive from the others so giving more weight to the historic data for that day (seven days ago) may improve the predictions for the current day.

In a typical implementation, weekdays (Monday to Friday) and weekend days (Saturday and Sunday) may be treated differently so that for a weekday like Tuesday, the other days of the week to be averaged are just four (Monday, Wednesday, Thursday and Friday). For a weekend day like Sunday, the other day of the week is Saturday. The separation between weekend and weekday's usage profiles is preferred because it better reflects the distinctive behavioral patterns of a household through a week.

If none of the Historic DC values for the other days at the (h−i) hour are available (valid) (YES at 718) then:

$$\text{Avg.HistoricDC}_{h-i} = \text{HistoricDC}_{d|h-i} \quad (720)$$

The exceptions allow for extracting some useful historic data even when the History Table is incomplete and only has one or a few days of valid data. A very singular case is when no data is available for any of the concerned days for the particular hour (h−i) (YES at 712) in which case Avg.HistoricDC$_{h-i}$ is invalid (714).

All the Averaged Historic DC values for the n hours prior to the current hour (h=h$_0$) give a typical usage profile for the same day of the week as the current day. This profile is now compared with the current day's usage during the n hours prior to the present hour so to calculate a usage ratio to be applied to the Averaged Historic DC values of the current and following hours and thus make usage predictions for the present and following hours.

If either the dividend or divisor is invalid (i.e. −1) for the set of ratios between current day's usage, taken from the Rolling Table, and the historic averages:

For $1 \leq i \leq n$, $$\text{Ratio}_{h-i} = \frac{\text{Calculated}DC_{h-i}}{\text{Avg. HistoricDC}_{h-i}}$$

(YES at 724), Ratio$_{h-i}$ becomes invalid (i.e. −1). In all other cases (NO at 724) Ratio$_{h-1}$ must always be limited to a range between MinRatio to MaxRatio anytime the formula exceeds those limits. MinRatio must be a value between 0 and 1. Typical values for MinRatio and MaxRatio could respectively be 1 and 5 but depending on the application, this limits can be widen up to a range of 0 (MinRatio) to infinity (MaxRatio). If only the divisor is 0 (YES at 726), Ratio$_{h-i}$=MaxRatio (728) and the Master Ratio can be determined by MasterRatio=MasterRatio+m$_i$×Ratio(h−i) (736). With this set of n ratios, the MasterRatio is calculated (using different weights for each hour prior to the current): Master Ratio=$\sum_{i=1}^{n} m_i \times \text{Ratio}_{h-i}$ (736) where m$_i$ are the MasterRatio weighting factors satisfying the following conditions:

$$0 \leq m_i \leq 1; \ \sum_{i=1}^{n} m_i = 1$$

If only the dividend is 0 (YES at 730), and RT(H−i)=0 (YES at 731) then Ratio(h−i)=1 (733). If RT(H−i) is not 0 (NO at 731) then Ratio$_{h-i}$=MinRatio (732). If the divisor is not zero (NO at 726) and the dividend is not zero (NO at 730), the Ratio(h−i) is determined (734) for updating the MasterRatio (736).

If all of the individual ratios are invalid (−1) then MasterRatio is invalid. If one or more, but not all, of the individual ratios are invalid, the summation will be done with just the valid terms multiplied by their corresponding weights, and divided by the summation of the weights corresponding to the valid terms:

$$\text{Master Ratio} = \frac{\sum_{i=1}^{n(\text{only with valid Ratio}_{h-i})} m_i \times \text{Ratio}_{h-i}}{\sum_{i=1}^{n(\text{only with valid Ratio}_{h-i})} m_i}$$

A ratio weight sum is determined by RatioWeightSum=RatioWeightSum+$m_i$ (738). The time period is incremented (740) and the ratio for the next period can be determined (NO at 742) if all the periods have not been averaged. If all the periods have been averaged (YES at 742) and the RatioWeightSum=0 (YES at 744) the MasterRatio is invalid (746). If the RatioWeightSum is not 0 (No at 744) the MasterRatio is updated by dividing by the RatioWeightSum (748).

Figure 8:
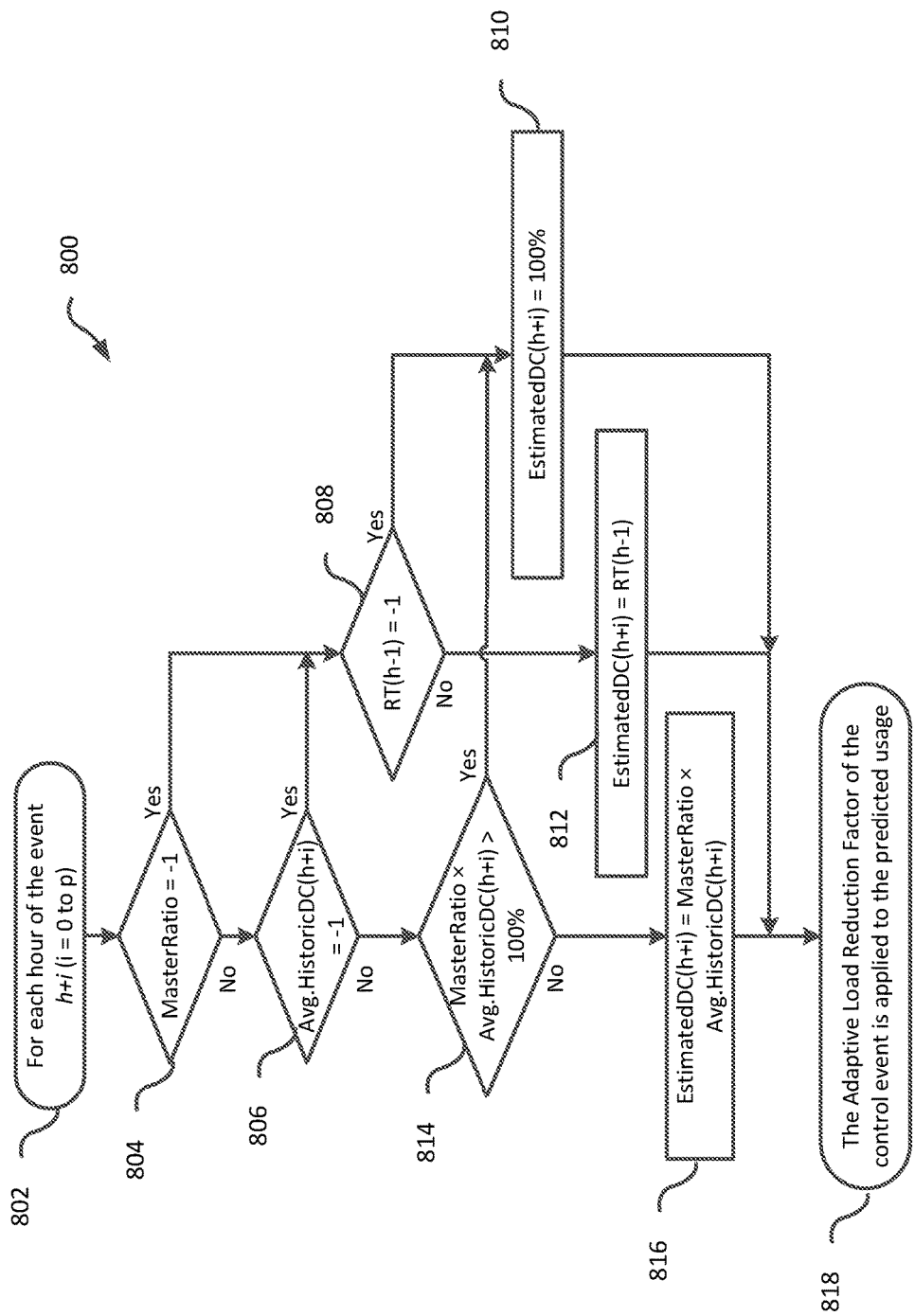
FIG. 8 shows a method for providing duty cycle prediction.

For illustration purposes, a typical implementation may just use a 4-hour Rolling Table (n=4) and if the weighting factors are chosen to give more weight to the hours closer to the current (h=$h_0$) so $m_1$=0.4, $m_2$=0.3, $m_3$=0.2 and $m_4$=0.1, the resulting Master Ratio is:

Master Ratio=0.4×$\text{Ratio}_{h-1}$+0.3×$\text{Ratio}_{h-2}$+0.2×$\text{Ratio}_{h-3}$+0.1×$\text{Ratio}_{h-4}$ Referring to method 800 of FIG. 8, an embodiment of a method of providing duty cycle (DC) prediction is shown. Using the Master Ratio and the Avg.HistoricDCh+i (applying the above disclosed formulas to calculate Avg.HistoricDCh−i), the duty cycles (equipment usage) for the current and following p hours can be predicted (802). The EstimatedDC must always be limited to a maximum of 100%. When either the MasterRatio (YES at 804) or Avg.HistoricDCh+i (YES at 806) is invalid, and the latest CalculatedDC is not invalid (NO at 808) the latest CalculatedDC from the Rolling Table is used:

$\text{EstimatedDC}_{h+i}=\text{CalculatedDC}_{h-1}$ (812)

When either the Master Ratio (YES at 804) or Avg.HistoricDCh+i (YES at 806) is invalid and the latest CalculatedDC is also invalid (YES at 808), any value from 0 to 100% could be assigned to the Estimated DC, yet to avoid an undue limitation to the equipment usage when insufficient data prevents a prediction, a value of 100% is recommended (810) as for the case of MasterRatio×Avg.HistoricDC(h+i) is greater than 100% (YES at 814). If the MasterRatio (NO at 804) and AvgHistoricDC(h+i) are valid (NO at 806) and the MasterRatio×AvgHistoricDC(h+i) less than 100% (NO at 814) then the EstimatedDC$_{h+i}$=Master Ratio×Avg.HistoricDC$_{h+i}$ is calculated (816). The adaptive load reduction factor of the control event is applied to the predicted usage (818).

When a Load Control Switch (LCS) has received a Load Control command specifying an Adaptive Load Reduction Factor (anywhere from 0, meaning that the load will not be allowed to run at all, to 100%, meaning that the load will be constrained to a maximum duty cycle equal to the predicted one) starting at the current hour and affecting the following p hours, the event duty cycle applied to the LCS relay controlling the equipment can be set, hour by hour, by the following formula:

For 0≤i≤p,

EventDC$_{h+i}$=EstimatedDC$_{h+i}$×Adaptive Load Reduction Factor

The event duty cycle changes at the start of each new hour and for the duration of the event.

An alternate method of applying the predicted equipment usage to and adaptive cycling event is to average the prediction for all the hours of the event and set a single EventDC for the entire event duration:

$$\text{EventDC} = \frac{\sum_{i=0}^{p} \text{EstimatedDC}_{h+i}}{p+1} \times \text{Adaptive Load Reduction Factor}$$

Figure 9:
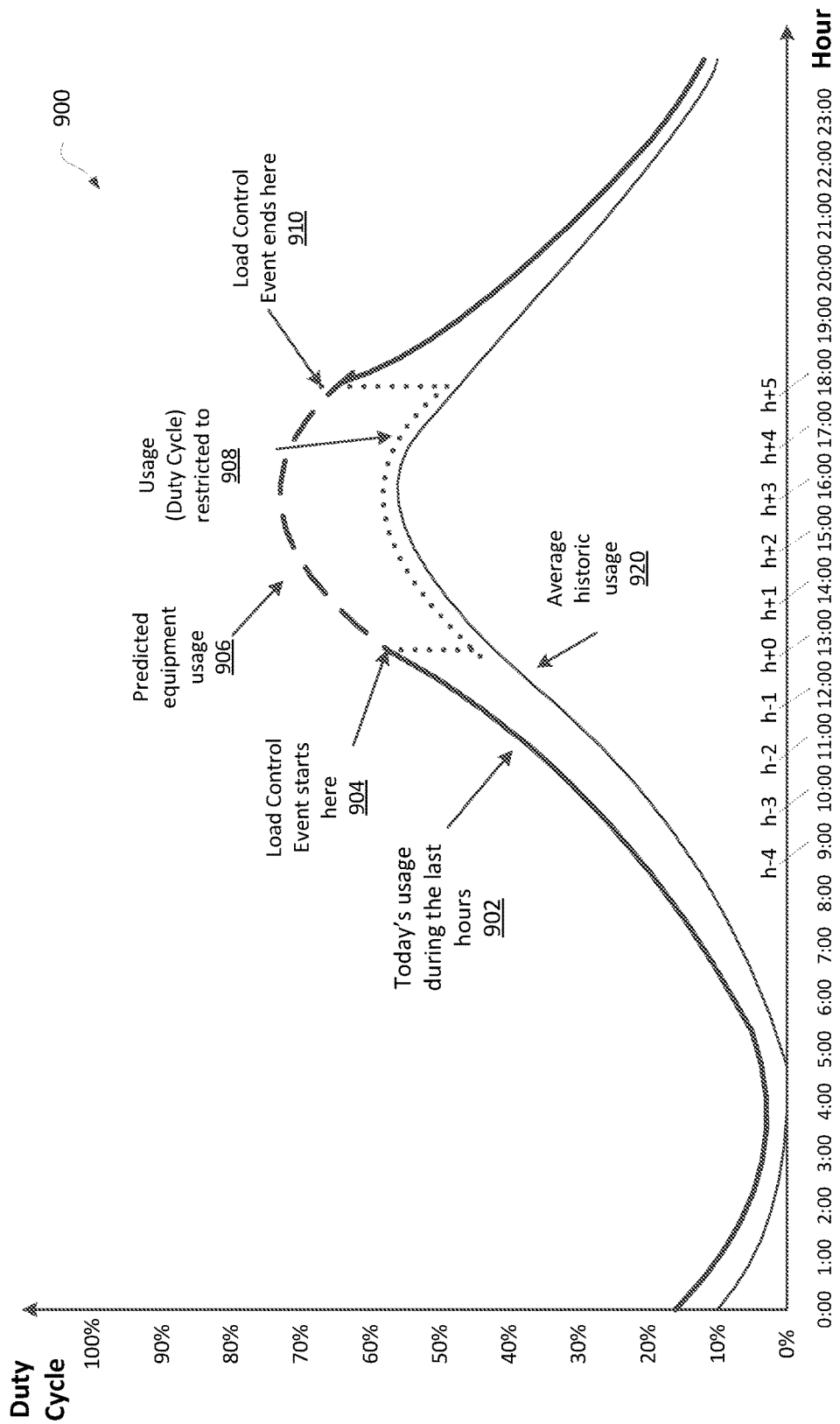
FIG. 9 shows the effect of applying the Adaptive Load Factor to the estimated (predicted) equipment usage.

FIG. 9 presents a graph 900 showing the effect of applying the Adaptive Load Factor to the estimated (predicted) equipment usage. For the duration of the event, the LCS relay will limit the equipment duty cycle to the calculated EventDC values. The usage for the present day 902, provided by the rolling table, is generated for a defined number of time periods for the present day. The predicted equipment usage 906 is derived by an averaged historic usage for the load control event time period from the history table. The load control event has a start time 904 and an end time 910 in the future. Using a predicted equipment usage 906 profile from the current usage 902 data, and the average historic usage 920 profile, a restricted duty cycle profile 908 is generated to restrict the appliance usage to comply with the load control event but provide a usage profile consistent with current and historic usage.

This method can also be incorporated in a thermostat which can directly respond to Adaptive Cycling events without the mediation of a Load Control Switch. In this implementation, the Adaptive Load Reduction Factor can more generically be an Adaptive Load Factor so values greater than 100% can be used meaning that the equipment should be run above the predicted usage (for example to provide over-cooling or over-heating in anticipation to a period of high energy cost or a load shedding event.

Other possible use of this predictive method is to create a daily profile of water heater usage and affect the heating cycles during the hours prior to a Load Control event so to maximize the stored thermal energy just by the time the event starts.

As an enhanced alternative to this prediction method, a daily or hourly command can be sent to the Load Control device (LCS, thermostat, etc.) to indicate whether a particular day or hour qualifies for updating the History Table. This could be useful for example to prevent updates during singular days like a holiday during a week day. The command could just invalidate the Calculated DC for the particular hour or hours in a day, so the formulas and rules disclosed will prevent its use for updating the History Table.

Another alternative can also provide daily or hourly commands to qualify the day or hour with an index (a factor from 0 to 1.00 or 0 to 100%) which can be multiplied to the corresponding Calculated DC so to create normalized History and Rolling Tables. Using a negative value for this index will invalidate a Calculated DC as in the first network alternative above.

Figure 10:
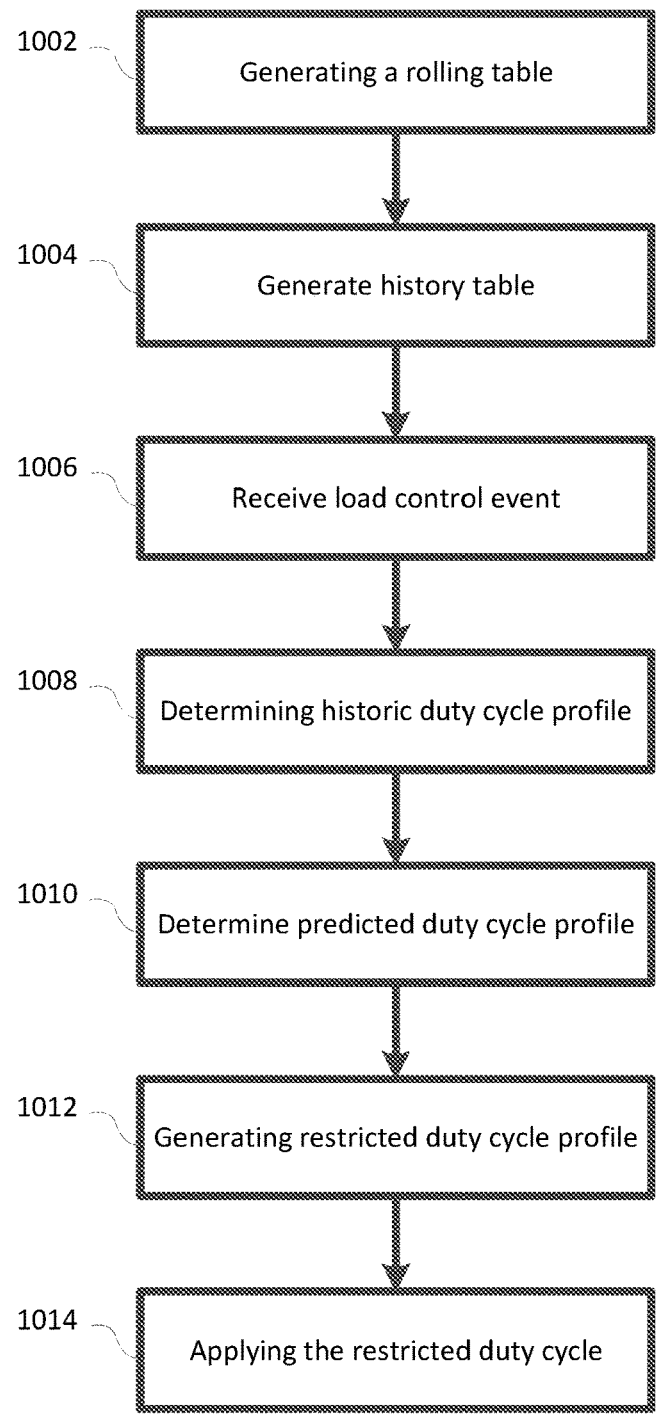
FIG. 10 show a method of adaptive duty cycling.

FIG. 10 shows a method 1000 adaptive duty cycling. A rolling table is generated comprising current duty cycle information of usage of the electrical appliance (1002). The rolling table contains duty cycle information for a previous N time periods relative to the current time period. The time period may be defined by hours, or may be of different sizes depending on the utility requirements, for example the periods may be 30, 45, 60, 90, 120 minute increments or may be variable based upon the time of day. As time periods expire the entries in the rolling table are shifted. A history table containing time period entries providing historic duty cycle information is generated (1004). The entries of the history table are updated based on duty cycle information from the rolling table, wherein the N+1 entry removed from the rolling table is used to update a respective history table entry. The time period entries are updated using a weighting factor being applied to the rolling table time period entries to provide a historic usage profile. A load control event is received from a utility defining an event time period for the event and a reduction factor (1006). A historic duty cycle profile from the history table for the load control event time period is determined (1008). A predicted duty cycle usage profile from the rolling table and the historic duty cycle usage profile for the load control event time period is determined (1010). Restricted duty cycle profile is generated for the load control event time period based upon the predicted duty cycle usage profile and the reduction factor (1012). The restricted duty cycle profile is applied to the electrical appliance during the load control event time period (1014) to reduce the electrical demand of the load to be consistent with the load control event requirements.

Each element in the embodiments of the present disclosure may be implemented as hardware, software/program, or any combination thereof. Software codes, either in its entirety or a part thereof, may be stored in a computer readable medium or memory (e.g., as a ROM, for example a non-volatile memory such as flash memory, CD ROM, DVD ROM, Blu-ray™, a semiconductor ROM, USB, or a magnetic recording medium, for example a hard disk). The program may be in the form of source code, object code, a code intermediate source and object code such as partially compiled form, or in any other form.

It would be appreciated by one of ordinary skill in the art that the system and components shown in FIGS. 1-10 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

The invention claimed is:

1. A method of performing adaptive load control of an electrical appliance, the method executed by a processor in a controller coupled to the electrical appliance, the method comprising:
   generating a rolling table comprising current duty cycle information of usage of the electrical appliance for N previous time periods within a current day;
   generating a history table containing time period entries providing historic duty cycle information for the electrical appliance for a plurality of days, each of the time period entries in the history table are updated based on a weighted average between previously stored duty cycle information for the time period and duty cycle information from the rolling table for the corresponding time period;
   receiving a load control event for the electrical appliance through a wireless receiver coupled to the processor, the load control event defining an event time period and a reduction factor to be applied to the electrical appliance to reduce electrical consumption;
   determining a historic duty cycle profile from the history table corresponding to the time period for which the load control event is to be applied;
   determining a predicted duty cycle usage profile for the load control event time period from the rolling table and the historic duty cycle profile;
   generating restricted duty cycle profile for the load control event time period based upon the predicted duty cycle usage profile and the reduction factor; and
   applying the restricted duty cycle profile to control the electrical appliance during the load control event time period;
   wherein the HVAC electrical appliance can operate at less than 100% duty cycle during peak demand events and the restricted duty cycle profile is applied to the electrical appliance during the load control event time period to reduce the electrical demand of the load to be consistent with the load control event requirements.

2. The method of claim 1 wherein the rolling table stores duty cycle information for previous N time periods of operation prior to a current period, wherein the history table is updated with the N+1 time period duty cycle information.

3. The method of claim 1 wherein the history information for the time period associated with the N+1 duty cycle information is modified using the N+1 duty cycle information as it is removed from the rolling table.

4. The method of claim 1 wherein the rolling table or history table is not updated during the load control event.

5. The method of claim 1 wherein the entries of the rolling table are updated for each time period.

6. The method of claim 1 wherein the duty cycle is determined as a percentage of appliance usage during a time period.

7. The method of claim 1 wherein applying the restricted duty cycle is performed by disconnecting the appliance from an electrical supply to meet the restricted duty cycle profile.

8. The method of claim 1 wherein applying the restricted duty cycle is performed by a thermostat associated with the appliance wherein a temperature setting is adjusted to meet the restricted duty cycle profile.

9. The method of claim 1 wherein the restricted duty cycle profile is determined by a duty cycle for a duration of the load control event time period.

10. The method of claim 1 wherein the restricted duty cycle profile is determined by a plurality of duty cycles each for an associated time period within the load control event time period.

11. The method of claim 1 further comprising receiving an indication of a preferential time period, wherein the duty cycle information associated with the preferential time period is weighted preferentially or overwrites existing duty cycle information for previously stored time periods in the history table.

12. A load control switch coupled to an electrical appliance, the load control switch comprising:
   a wireless receiver;
   a processor coupled to the receiver; and
   a memory containing instructions for performing adaptive load control of the electrical appliance, the instruction which when executed the processor for performing:
      generating a rolling table comprising current duty cycle information of usage of the electrical appliance for N previous time periods within a current day;
      generating a history table containing time period entries providing historic duty cycle information for the electrical appliance for a plurality of days, each of the time period entries in the history table are updated based on a weighted average between previously store duty cycle information for the time period and duty cycle information from the rolling table for the corresponding time period;
      receiving through the wireless receiver a load control event for the electrical appliance defining an event time period and a reduction factor to be applied to the electrical appliance to reduce electrical consumption;

determining a historic duty cycle profile from the history table corresponding to the time period for which the load control event is to be applied;

determining a predicted duty cycle usage profile for the load control event time period from the rolling table and the historic duty cycle profile;

generating restricted duty cycle profile for the load control event time period based upon the predicted duty cycle usage profile and the reduction factor; and applying the restricted duty cycle profile to control the electrical appliance during the load control event time period;

wherein the HVAC electrical appliance can operate at less than 100% duty cycle during peak demand events and the restricted duty cycle profile is applied to the electrical appliance during the load control event time period to reduce the electrical demand of the load to be consistent with the load control event requirements.

13. The load control switch of claim 12 wherein the rolling table stores duty cycle information for previous N time periods of operation prior to a current period, wherein the history table is updated with the N+1 time period duty cycle information.

14. The load control switch of claim 12 wherein the history information for the time period associated with the N+1 duty cycle information is modified using the N+1 duty cycle information as it is removed from the rolling table.

15. The load control switch of claim 12 wherein the rolling table or history table is not updated during the load control event.

16. The load control switch of claim 12 wherein the entries of the rolling table are updated for each time period.

17. The load control switch of claim 12 wherein the duty cycle is determined as a percentage of appliance usage during a time period.

18. The load control switch of claim 12 wherein applying the restricted duty cycle is performed by disconnecting the appliance from an electrical supply to meet the restricted duty cycle profile.

19. The load control switch of claim 12 wherein applying the restricted duty cycle is performed by a thermostat associated with the appliance wherein a temperature setting is adjusted to meet the restricted duty cycle profile.

20. The load control switch of claim 12 wherein the restricted duty cycle profile is determined by a duty cycle for a duration of the load control event time period.

21. The load control switch of claim 12 wherein the restricted duty cycle profile is determined by a plurality of duty cycles each for an associated time period within the load control event time period.

22. The load control switch of claim 12 further comprising receiving an indication of a preferential time period, wherein the duty cycle information associated with the preferential time period is weighted preferentially or overwrites existing duty cycle information for previously stored time periods in the history table.

* * * * *